G. J. BUNDY.
BATTERY COVER.
APPLICATION FILED JUNE 29, 1918.
1,398,358.
Patented Nov. 29, 1921.
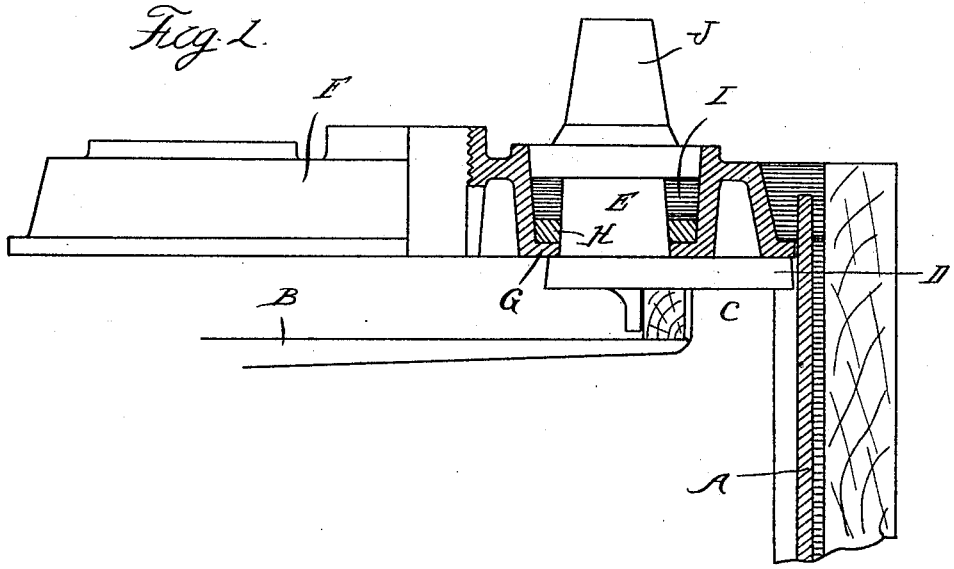
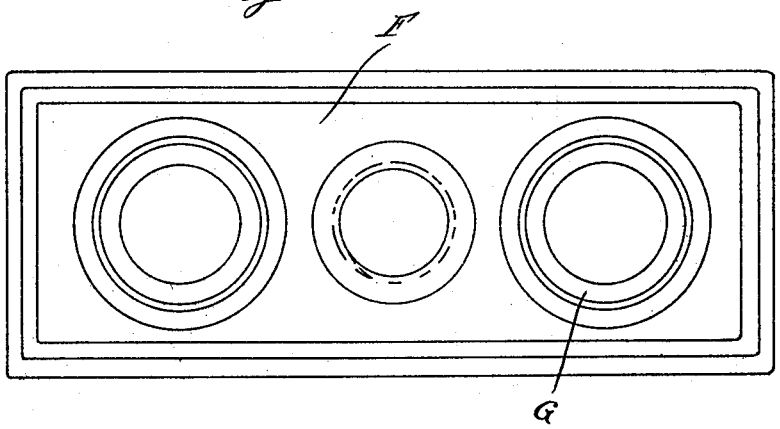
Inventor
Glenn J. Bundy
By Whittemore Hulbert & Whittemore
Attorneys

UNITED STATES PATENT OFFICE.

GLENN J. BUNDY, OF DETROIT, MICHIGAN, ASSIGNOR TO DETROIT BATTERY COMPANY, OF DETROIT, MICHIGAN, A CORPORATION OF MICHIGAN.

BATTERY-COVER.

1,398,358.  Specification of Letters Patent.  Patented Nov. 29, 1921.

Application filed June 29, 1918. Serial No. 242,561.

*To all whom it may concern:*

Be it known that I, GLENN J. BUNDY, a citizen of the United States of America, residing at Detroit, in the county of Wayne and State of Michigan, have invented certain new and useful improvements in Battery-Covers, of which the following is a specification, reference being had therein to the accompanying drawings.

The invention relates to electrical storage batteries or accumulators, and it is the object of the invention to provide effective sealing means for the electrical terminal passing out through the cover. To this end the invention comprises the novel construction of cover and sealing means as hereinafter set forth.

In the drawings:

Figure 1 is a section through the cover; Fig. 2 is a plan view thereof.

In the present state of the art storage batteries used on moving vehicles are provided with covers designed to retain the liquid electrolyte and with electrical terminals passing through said covers. On account of the motion of the vehicle there is a tendency for the electrolyte to splash up upon the terminal, and it has been found difficult to prevent leakage out through the cover and corrosion of the connecting conductor. Sealing compounds have been employed for maintaining a tight joint, but the expansion and contraction due to temperature changes often render such sealing ineffective. With the present invention I have obtained a construction which will maintain a liquid-tight seal at all times and without exerting any detrimental stress upon the cover or its connections.

As shown A is the battery jar, B the plates therein having the upwardly-extending terminals C and the strap D which connects to the common outwardly-extending terminal E. F is the battery cover formed of insulating material and apertured for the passage of the terminal E.

To form an effective seal around the terminal I provide the cover F with a cup-shaped portion G apertured in its bottom for the passage of the terminal E. This cup is preferably of a downwardly-tapering form, while the terminal E is provided with an upward taper so as to leave an annular space of wedge-shaped cross section therebetween. In this space I first place a sealing gasket H of resilient material, preferably rubber, and above the gasket the cup is filled with a sealing compound I. Above this is a metal plate or petticoat J, which is secured by "burning on" on the terminal, that is, by heating until the soft metal is fused together.

With the construction as described a liquid-tight seal is formed around the terminal, which prevents leakage of any of the electrolyte outward through the cover. This connection is not only tight when first formed but after it has been in use and subjected to varying temperatures. Thus if there is any contraction the rubber gasket will yield to permit the same, and by reason of its resiliency will also expand when the pressure is relieved to maintain the seal. As a consequence, the electrolyte is excluded from the terminal and corrosion is thereby prevented.

What I claim as my invention is:

1. The combination with a battery plate and a terminal connection therefor, of a cover having an apertured cupped portion through which said terminal passes, a resilient gasket surrounding said terminal within said cup, a sealing compound in said cup above said gasket and a petticoat above said sealing compound and surrounding said terminal within said cup, said resilient gasket being contractible and expansible to force said sealing compound against said petticoat and to maintain said sealing compound under pressure at all times.

2. The combination with a battery plate and a terminal connection therefor, of a cover plate having an apertured cup portion through which said terminal passes, a resilient gasket surrounding said terminal and seated within said cup, a sealing compound surrounding said terminal above said gasket, and means upon said terminal for maintaining said sealing compound under pressure, said resilient gasket being contractible and expansible to maintain said sealing compound under pressure at all times.

In testimony whereof I affix my signature.

GLENN J. BUNDY.